United States Patent [19]

Cozac et al.

[11] Patent Number: 5,078,777
[45] Date of Patent: Jan. 7, 1992

[54] GLASS-MELTING FURNACE

[75] Inventors: Daniel Cozac, Braine l'Alleud; Jean-François Simon, Brussels, both of Belgium

[73] Assignee: Glaverbel, Brussels, Belgium

[21] Appl. No.: 440,364

[22] Filed: Nov. 22, 1989

Related U.S. Application Data

[62] Division of Ser. No. 188,553, Apr. 29, 1988, Pat. No. 4,929,266.

[30] Foreign Application Priority Data

Apr. 30, 1987 [GB] United Kingdom ............... 8710298

[51] Int. Cl.⁵ .................... C03B 5/04; C03B 5/183
[52] U.S. Cl. ............................. 65/347; 65/339; 65/346
[58] Field of Search ............. 65/335, 339, 346, 347

[56] References Cited

U.S. PATENT DOCUMENTS

| 246,109 | 8/1881 | Fetters | 65/347 |
|---|---|---|---|
| 1,598,307 | 10/1922 | Pike | 65/347 |
| 1,657,106 | 1/1928 | Brownlee | 65/343 |
| 2,512,761 | 8/1947 | Arbeit | 65/136 |
| 3,015,190 | 1/1962 | Arbeit | 65/347 |
| 3,260,587 | 7/1966 | Dolf et al. | 65/135 |
| 3,888,650 | 6/1975 | Gell et al. | 65/347 |
| 3,979,197 | 9/1976 | Froberg | 65/135 |
| 4,594,089 | 6/1986 | Kurata | 65/135 |

FOREIGN PATENT DOCUMENTS

| 0086858 | 8/1983 | European Pat. Off. |
|---|---|---|
| 2550523 | 9/1983 | France . |
| 250536 | 7/1926 | United Kingdom . |
| 597842 | 2/1948 | United Kingdom . |
| 599957 | 3/1948 | United Kingdom . |
| 1480935 | 10/1974 | United Kingdom . |
| 2153343 | 8/1985 | United Kingdom . |

Primary Examiner—Joye L. Woodard
Attorney, Agent, or Firm—Spencer & Frank

[57] ABSTRACT

A continuous glass-melting tank furnace includes a melting compartment including a melting tank having a lower part, and a superstructure equipped with heaters for receiving and melting raw batch material. Additionally included is a separate refining compartment including a refining tank and a superstructure equipped with a further heater, the refining tank having a lower part and including a transverse sill which divides the refining tank into an upstream refining cell and a downstream refining cell, each of the upstream refining cell and the downstream refining cell having respective upstream ends and downstream ends, and the further heater being arranged to heat melt in the upstream refining cell for creating a spring zone located closer to the downstream end of the upstream refining cell and a circulation of melt in the upstream refining cell which feeds the spring zone. A throat allowing communication between the lower parts of the melting tank and the refining tank, and a conditioning tank for receiving melt from the refining tank are also included.

19 Claims, 7 Drawing Sheets

GLASS-MELTING FURNACE

This is a division of application Ser. No. 07/188,553 filed Apr. 29, 1988, now U.S. Pat. No. 4,929,266.

BACKGROUND OF THE INVENTION

1. Field of the Invention

This invention relates to a method of manufacturing glass in which raw material is fed as a batch to a continuous glass-melting tank furnace. The method comprises melting the batch in a melting tank and passing the melt to a refining tank via a submerged throat, heating the melt in the refining tank to de-gas it, delivering molten refined glass to a conditioning tank and there bringing it to a desired working temperature. The invention includes glass manufactured by such a method, and it extends to a continuous glass-melting tank furnace having a melting compartment comprising a tank and superstructure equipped with heating means defining a melting zone for receiving and melting raw batch material, a separate refining compartment also comprising a tank and superstructure equipped with heating means, means defining a throat allowing communication between the lower parts of the melting and refining tanks, and a conditioning tank for receiving melt from the refining tank.

2. Description of the Related Art

In the manufacture of glass on an industrial scale, various problems arise. Among these problems are that of economy regarding heating costs, and that of obtaining a properly refined, bubble-free glass.

It is of course well known that economies of scale are possible, and that a melting furnace of any given size will be most economical when run at its designed production rate. In the remainder of this specification it will be assumed that any furnace referred to is being run at a given, most economical production rate.

It is well known that the reactions which take place between the constituents of the raw batch during melting give rise to a considerable amount of surface foam on the melt, and bubbles of gas within the melt. It is also known that in order to refine the glass, that is to say, to ensure the substantially no bubbles remain in the melt which is drawn off for shaping, temperatures are required which are higher than those which are in fact necessary for melting the glass.

Classical glass-melting furnaces have a single tank in which melting and refining take place. Material in the tank is heated from above by burners, and the tank holds a molten mass which at the charging end of the tank is covered by unmelted or only partly melted batch material, and by foam. Somewhere close to the center of the tank there will be a point, the "hot spot" where the melt has its highest temperature and thus least density. Accordingly there will be a "spring zone" of rising currents within the melt. At the walls of the tank, the melt will be at its coolest, and there will be falling currents there. As a result, there will be a return surface current flowing from the spring zone to the charging end of the tank which tends to maintain unmelted batch and foam in the upstream portion or melting zone of the tank so that such batch and foam cannot be drawn off at the downstream end of the refining zone. Such currents will also tend to carry heat energy away to the walls of the tank where it becomes dissipated, and it is not possible to exercise any degree of independent control of the temperatures of the melt in the melting and refining zones of the tank.

In an effort to obtain greater heat economy, proposals have been made to divide the furnace into separate melting and refining tanks. By working in this way, it is possible to exercise a considerable degree of independence in control of the temperatures in the melting and refining tanks. As a result, the melting tank can be run at lower temperatures than are required in classical furnaces with consequent savings in heating costs.

An example of such a plural-tank melting furnace is described in French Patent Specification No. 2,550,523 (Saint-Gobain Vitrage SA). According to the proposals of that specification, glass feeds from the bottom of a melting tank through a throat into the base of a separate refining tank which is shaped as a chimney up which the melt flows in a uniform ascending current while being heated. The melt then passes directly to a conditioning tank where it is brought to a desired working temperature. In fact the principal source of heat both for melting and refining the glass is electric current, though optional burners over the refining chimney are shown.

The cost savings which can be realized by using the previously proposed plural-tank melting furnaces are however attainable only at the expense of a lowering of the homogeneity of the glass leaving the furnace. There is also an occasional tendency for the glass to be incompletely degasified. The formation of the refining tank as a relatively deep chimney and the employment of submerged electrical heaters to maintain a strong ascending current of glass in this chimney as proposed in the above mentioned French Patent Specification No. 2,550,523 would not avoid these disadvantages.

SUMMARY OF THE INVENTION

It is an object of this invention to provide a method of manufacturing glass which facilitates the economical production of glass of a given composition and quality.

According to the present invention, there is provided a method of manufacturing glass in which raw material is fed as a batch to a continuous glass-melting tank furnace, which method comprises melting the batch in a melting tank and passing the melt to a refining tank via a submerged throat, heating the melt in the refining tank to de-gas it, delivering molten refined glass to a conditioning tank and there bringing it to a desired working temperature, characterized in that the refining tank is divided into upstream and downstream refining cells by a transverse sill, and the melt in the upstream refining cell is heated to create a spring zone located towards the downstream end of that cell and a circulation of melt in that cell which feeds the spring zone.

The adoption of the present invention facilitates the economical production of glass of a given composition and quality.

By virtue of the presence of the spring zone in the upstream refining cell, there will be a better defined circulation of the melt within that cell. This promotes refining of the melt, and also, it promotes a good mixing of the melt in that region. Furthermore, it is likely that surface return currents will be created to flow in the upstream direction over part of the area of the melt in the upstream refining cell. Any such currents would act to constrain foam floating on the melt there from flowing in the downstream direction, over the transverse sill and towards the conditioning tank. Melt flowing in the downstream direction over the transverse sill will be close to the spring zone and thus close to the hottest part of the tank, and because of the relative shallowness of the melt over the sill, any residual bubbles in the melt can escape fairly easily there. Thus, for a given composition and quality of glass being produced, the method can be performed with the refining tank being run at a lower temperature than would otherwise be required, and thus more economically.

Furthermore, because of the pattern of current in the melt in the upstream portion of the refining tank, a greater bubble population can be tolerated in the melt feeding into the refining tank. Accordingly, the melting tank can also be run cooler for a given composition and quality of glass, thus affording further economies.

A further advantage of manufacturing glass by a method according to the present invention is that it facilitates switching over from the production of glass of one composition to glass of another. Because the furnace is divided up into separate melting and refining tanks, and because the refining tank sole is provided with a sill, distinct current circulation patterns are set up in the melt. The result is that when the batch composition is changed, for example from a batch for producing clear glass to one for producing colored glass, the change in composition in the melt tends to take place much more rapidly than it would otherwise, and the quantity of waste glass of an intermediate composition is reduced. It may be noted here that such waste glass of an intermediate composition is often difficult to make use of even as cullet for remelting. If such waste glass is to be used as cullet, the necessary care must be taken to adjust the other ingredients of the raw batch constantly depending on the varying composition of the cullet.

The shape of the volume occupied by the melt in the upstream refining cell has an important influence on the currents in that cell. In preferred embodiments, the level of the surface of the melt is so regulated that the length of the upstream refining cell is greater than the mean depth of melt in that cell. The adoption of this feature is conducive to the formation of a continuous pattern of circulating currents in the upstream part of that cell, and this further promotes refining and homogenization of the melt in that region.

Advantageously, the mean length of the upstream refining cell is at least equal to half of its means width, and preferably, the transverse sill is spaced from the upstream end wall of the refining tank by a distance which is at least equal to the mean width of the upstream refining cell. When adopting one or both of these features, the angle subtended by the upstream end wall of the refining tank at the spring zone is less than it otherwise would be. As a result, any surface return currents flowing from the spring zone towards the upstream end wall of the refining tank make a more acute angle with the longitudinal direction of the furnace and they may thus have an improved restraining effect on any foam on the melt in the refining tank and tend to pin it against the upstream end wall of the refining tank so that it cannot flow to the conditioning tank.

It is preferred that the level of the surface of the melt is so regulated that the mean depth of melt above the transverse sill is at most two fifths of the mean depth of the melt in the downstream refining cell. In operation, there is likely to be a return current of molten glass which flows back from the downstream refining cell, over the transverse sill, and into the upstream refining cell. This return current, which may even flow from the conditioning tank, will consist of glass which is cooler than that which forms a forward current flowing downstream from the upstream refining cell. As a result, the forward current flowing over the transverse sill will tend to be confined to a surface layer which, by the adoption of this preferred feature, will be rather less than two fifths of the depth of the melt in the downstream refining cell. Since the melt feeding that forward current must come from the rather close spring zone at the hottest part of the refining tank, that forward current will itself be strongly heated, and strong heating of a rather thin surface layer is highly beneficial for refining of the melt.

The furnace may be heated electrically using electrodes immersed in the melt, and/or by burners, the choice being a matter of convenience and economy. In preferred embodiments of the invention, the refining tank is heated at least in part by heaters which heat the melt most strongly at a location towards the downstream end of the upstream refining cell. This is a very simple way of creating a spring zone in the melt close to the transverse sill, without unduly heating the wall structure which separates the melting and refining compartments, with consequent benefits to the resistance of that wall structure to erosion by the melt. The adoption of this feature also promotes heating of the melt flowing over the transverse sill.

It is also preferred that there is a heater located to heat the melt above said transverse sill. This promotes substantially complete refining of the melt.

Advantageously, the depth of the melt in at least a part of the melting tank is less than the depth of the melt in at least a part of the refining tank. By adopting this feature, the melting tank can be made shallower so that it will contain less melt, and as a result heating economies can be effected. It will be appreciated that most if not all of the melt in the melting tank will be covered by unmelted batch material or by foam. This tends to shield the sole of the melting tank from the heating effect of any burners in the melting compartment. The refining tank on the other hand should contain no unmelted material, and any foam there should be substantially confined to its upstream end. A certain depth of melt in the refining tank is therefore desirable, not only for allowing room for a beneficial circulation of the melt, but also for allowing a certain measure of shielding of the refining tank sole by the melt against the effect of burners over that tank, so as to reduce the tendency of the refining tank sole to be eroded by the melt.

Preferably, the melt flows from the melting tank into the refining tank via a rising passageway. This is effective in preventing return currents flowing upstream from the refining tank back into the melting tank, and is therefore beneficial for heat economy, and also for promoting a more rapid changeover between the manufacture of glasses of different compositions.

In some such embodiments, the melt is advantageously caused to flow from the melting tank into the refining tank through a throat located beneath the level of the sole of the upstream refining cell. Dropping the level of the throat in this way tends to give an increased cooling at the throat: the sole and end walls of the throat may project from the base of the tank furnace so that there will be increased heat radiation from the refractory parts making up the throat. As a result, the melt entering the refining tank will tend to be cooler, and it will therefore enter the refining tank as a forward flowing bottom current which is more viscous than the melt already in the refining tank. It will be apparent that the flow rates and the forces driving the forward and return currents in the refining tank upstream of the transverse sill must be in balance. Accordingly, because of the viscosity differences between the currents in the melt there, the cooler bottom current will take up more space and will constrict the return current to a relatively shallow surface layer. The surface return current will therefore be caused to flow faster. This is beneficial for stabilizing the current circulation and it promotes the confinement of any foam against the wall structure separating the melting and refining compartments, and effective refining of the melt.

Alternatively, or in addition the melt may with advantage be caused to flow over a second sill provided towards the upstream end of the upstream refining cell. Such a second sill can act as a barrier which restricts the volume of the space occupied by the surface return current, and accordingly also has the effect of increasing its speed. Again, current stabilisation, foam retention and effective refining are promoted. Care must be taken when adopting this feature however, because it has the consequence that the forward current flowing along the sole of the refining tank will be at an increased temperature. This increase in temperature should not be so high as to cause unacceptable erosion of the sole of the upstream refining cell.

Advantageously, the melt in the upstream refining cell is heated by at least one immersed electrode. The use of such an electrode will have an effect on the density of the melt in its immediate vicinity, and it accordingly enables very fine control of the pattern of flow currents in the melt. In particular, by locating such an electrode at or slightly upstream of the spring zone, the location of the spring zone can be better defined or stabilized, thereby promoting a beneficial circulation of the melt for refining and mixing it.

In some preferred embodiments of the invention, gas is injected into the melt at the spring zone in the upstream refining cell. It may seem somewhat contradictory to introduce gas into the melt in the refining tank, but it should be kept in mind that the purpose of refining is to remove the rather small gas bubbles in the melt due to melting reactions. Much larger gas bubbles can be introduced by injection. It will be appreciated that the forces causing bubbles in the melt to rise depend on the cube of the bubble radius while the forces hindering such rise depend on the square of their radius. Such injected bubbles will have the effect of stabilizing the position of the spring zone, constraining the rising currents there to flow in a more nearly vertical direction and more quickly, and this promotes a stable pattern of circulating currents in the melt and thus refining of the melt. Such gas injection is also beneficial in reducing the time required for changing the composition of the glass being produced.

In embodiments of the invention in which the melt is heated by one or more immersed electrodes and in which gas is injected as discussed above, it is especially preferred that the melt in the upstream refining cell is heated by at least one immersed electrode at a location closer to the upstream end of that cell than a location where gas is injected into the melt. The adoption of this preferred feature has been found to promote a particularly favorable and stable pattern of flow currents within the melt in the upstream refining cell.

Advantageously, the melt is caused to flow from the refining tank to the conditioning tank via a neck. This provides a constraint on flow between the refining tank and the conditioning tank, in particular in reducing return currents from the conditioning tank to the refining tank, which is beneficial for the pattern of current flow in the furnace. Also such constraint is of advantage if it is desired to change from the production of glass of one composition to glass of another composition: such changeover can be effected more quickly with a consequent saving in waste glass of an intermediate composition.

Preferably, the melt is caused to flow from the refining tank to the conditioning tank beneath a floater provided at the downstream end of the refining tank. The presence of such a floater causes the melt entering the conditioning zone to do so from subsurface currents in the refining tank, and it provides an effective final safety barrier against the entry of surface foam into that conditioning zone.

In the most preferred embodiments of the invention, the maximum temperature of the glass in the refining tank is kept higher than the maximum temperature of the glass in the melting tank. This promotes fuel economy insofar as the melting tank is not heated to the high temperatures required for refining the glass.

Advantageously, the maximum temperature of the glass in the refining tank is maintained at a value which is at least 70° C. greater than the maximum temperature of the glass in the melting tank. This promotes rapid refining of the glass. In fact, the speed of refining is increased by increasing the temperature in the refining tank, so for the most rapid refining, the tank could be run at a temperature as hot as could be withstood by the refractory material of which it is formed. However in order to limit heat losses from the refining tank, such temperature differential is preferably not more than 300° C. It has been found that, when using any given furnace and for any given quality and composition of glass, the maintenance of such a temperature differential gives the greatest benefit in fuel economy.

The invention is applicable to the manufacture of many different types of glass. It will be appreciated that the optimum temperatures to be maintained in the melting and refining tanks will depend on the type of glass being produced. For example borosilicate glasses will in general require higher temperatures than soda-lime glasses to achieve a given quality. However general statements for all types of glass can be made by referring to the temperature at which the logarithm (to base 10) of the viscosity of the glass in Poises (10 P eqaul 1 pascal second) has a given value, say N: this is denoted by the expression "the N/temperature". In this description references to the N temperature will be followed by references in parenthesis to actual temperature values which are the corresponding temperatures for soda-lime glass.

It is preferred that the maximum temperature in the refining tank is maintained between the 2.08 temperature (1450° C.) and the 1.85 temperature (1525° C.). Alternatively, or in addition, it is preferred that the maximum temperature in the melting tank is maintained between the 2.42 temperature (1350° C.) and the 2.16 temperature (1425°.C.). Within those ranges, the maximum temperature required in the refining tank is largely governed by the desired quality of the glass being produced, and the maximum temperature required in the melting tank is governed both by glass quality and by the presence or absence of melting accelerators such as sodium sulphate which may be included in the batch. Thus for example when melting glass for the production of float glass, it would be desirable to work towards the upper ends of the specified temperature ranges, but for the manufacture of for example bottle glass it would be sufficient to work at the lower ends of those temperature ranges, especially if melting accelerators were to be included in the batch material.

By way of comparison, it may be noted that the maximum temperature in a conventional furnace in which glass for the production of float glass is melted and refined in a single tank is, for a particular batch composition, between the 1.85 temperature (1525° C.) and the 1.75 temperature (1550° C.). The present invention can be used for the production of float glass of the same quality from the same batch composition while working within the temperatures ranges referred to above. Accordingly, the maximum temperature in the refining zone can be lower, and that in the melting zone can also be lower, than when using a conventional process, and this reduced requirement for high temperatures leads to further economy in the use of fuel.

In preferred embodiments of the invention, substantially the whole surface of the melt in the melting tank is covered by unmelted and partially melted batch material. This ensures concentration of heat onto the batch material to be melted, and substantially avoids the presence of clear surface areas of the melt in the melting tank. If such areas were present, there would be a direct path for radiation from the tank superstructure to the refractory material forming the sole of the tank and this could cause overheating of that material. Such overheating would lead to increased heat loss through the melting tank sole, and would also shorten the useful working life of the refractory sole material.

Advantageously, the plan area of the refining tank is at least as great as that of the melting tank. The adoption of this feature has been found to be particularly beneficial for the economical manufacture of well refined glass.

In some preferred embodiments of the invention, melt is fed from the conditioning tank to a float chamber. The use of a float chamber is particularly advantageous for the manufacture of sheet glass of high quality. Alternatively or in addition, melt can be fed from the conditioning tank to a drawing machine. This is particularly appropriate for the manufacture of sheet glass which is too thin to be made conveniently by the float process.

The present invention includes glass manufactured by a method as hereinbefore defined.

The invention also extends to the furnace for the manufacture of glass. The invention provides a continuous glass-melting tank furnace having a melting compartment comprising a tank and superstructure equipped with heating means for receiving and melting raw batch material, a separate refining compartment also comprising a tank and superstructure equipped with heating means, means defining a throat allowing communication between the lower parts of the melting and refining tanks, and a conditioning tank for receiving melt from the refining tank, characterised in that the refining tank is divided into upstream and downstream refining cells by a transverse sill, and the heating means in the refining compartment is arranged to heat melt in the upstream refining cell to create a spring zone located towards the downstream end of that cell and a circulation of melt in that cell which feeds the spring zone.

Such a furnace facilitates the economical production of glass of a given composition and quality, for example by a process as hereinbefore defined. The furnace construction allows controlled circulation of melt contained in the upstream cell of the refining tank which is beneficial for refining the glass. Also, such a furnace is quite easy to build. For example in contrast to the furnace disclosed in French Patent Specification No. 2,550,523 (Saint-Gobain Vitrage SA), substantially the whole furnace comprising the melting tank, the refining tank and the conditioning zone can be constructed with its sole at the same or nearly the same level. Because the furnace of French Patent Specification No. 2,550,523 requires a vertical refining chimney, it is necessary that the soles of the melting and conditioning zones be at very different levels, and this in turn involves substantial additional work in building the support structure for the conditioning zone (and any forming apparatus downstream of the conditioning zone) which is not required for the construction of a tank furnace according to the present invention.

Preferably, the mean depth of the upstream cell of the refining tank is less than the length of that cell. This promotes the formation of a continuous pattern of circulating currents in a melt in the upstream part of that cell, and this further promotes refining and homogenization of the melt in that region.

Advantageously, the mean length of the upstream cell of the refining tank is at least equal to half of its mean width, and it is preferred that the transverse sill is spaced from the upstream end wall of the refining tank by a distance which is at least equal to the mean width of the upstream refining cell. The adoption of one or both of these features has a beneficial effect on the pattern of current flow in the melt in that region of the refining tank, and it also allows room for adequate heating of that melt without subjecting the wall structure separating the melting and refining compartments to such excessive heat as would unnecessarily shorten it working life due to erosion.

Preferably, the mean height of the transverse sill above the sole of the downstream cell of the refining tank is at least three fifths of the mean depth of that downstream cell. A sill of such height is beneficial for stabilising current flow patterns and for promoting good refining of melt flowing over it.

Advantageously, the refining compartment is provided with heaters which, considered as a group, are located closer to said transverse sill than to the upstream end of that compartment. This is a very simple way of providing the heating means required. Of course such heaters may be supplemented with other heating means if required, for example with heating electrodes which project into the refining tank.

Preferably, there is a heater located to heat material flowing above the transverse sill. This is beneficial for ensuring heating and refining of a forward flowing surface current of the melt which flows across that sill.

Advantageously, the sole of at least a part of the melting tank is at a higher level than the sole of at least a part of the refining tank. This allows the use of a melting compartment of smaller capacity which can give useful savings in fuel consumption, while at the same time allowing a measure of protection to the sole of the upstream cell of the refining tank against overheating and erosion, due to the depth of melt which is above it in use.

Preferably, the throat communicates with the upstream refining cell via a rising passageway. This is effective in preventing return currents flowing upstream from the refining cell back into the melting tank, and is therefore beneficial for heat economy, and also for promoting a more rapid changeover from the manufacture of glass of one composition to glass of another.

In some such embodiments, it is preferred that the throat is beneath the level of the sole of the refining tank. It is quite simple to drop the level of the sole of the furnace over the rather small area necessary to define such a throat. In addition to having a beneficial effect on the flow pattern of the melt between the shadow wall and the transverse sill as has previously been adverted to, dropping the level of the throat in this way allows the refractory defining the throat to be maintained at a lower temperature, thus making that refractory less liable to erosion.

Alternatively, or in addition, a second sill may be provided towards the upstream end of the refining tank. Such a second sill is very easy to install, and can have a similar beneficial effect on the flow pattern of the melt. This sill can also act to shade the region of the throat from the heaters in the refining zone, thus again prolonging the working life of the refractory defining the throat. It will be appreciated that that second sill will itself be exposed to quite strong heating in operation of the furnace, so it should be made of a rather high grade refractory material. Also, the use of such a sill can have the effect of increasing the temperature of the currents flowing along the bottom of the upstream refining cell between the two sills, and consideration should accordingly be given as to whether it is necessary to make that portion of the sole of a higher grade refractory than would otherwise be done.

Advantageously, at least one heating electrode is provided for immersion in the melt in the upstream refining cell. The use of such an electrode enables very fine control of the pattern of flow currents in the melt. In particular, by locating such an electrode at or slightly upstream of the spring zone, the location of the spring zone can be better defined or stabilized thereby promoting a beneficial circulation of the melt for refining and mixing it.

In some preferred embodiments of the invention, a means is provided for injecting gas into the refining tank at the spring zone. This stabilizes the spring zone and has a beneficial effect on the current circulation pattern in the melt.

In embodiments of the invention in which the melt is heated by one or more immersed electrodes and in which gas is injected as discussed above, it is especially preferred that at least one heating electrode is provided at a location closer to the upstream end of that cell than the location of the gas injection means. The adoption of this preferred feature has been found to promote a particularly favorable and stable pattern of flow currents within the melt in the upstream refining cell.

The refining tank is preferably connected to the conditioning tank via a neck. Such a neck is very simple to construct, and its use has a favorable effect on the flow pattern in the melt, particularly in reducing return currents, and on the speed with which a change can be made from the production of glass of one composition to glass of another.

Advantageously, a floater is provided at the downstream end of the refining tank. Such a floater can prevent any material floating on top of the melt from flowing further downstream. If such a floater is provided located in a neck between the refining tank and the conditioning tank, it can be made shorter than if it is located in the refining tank itself.

Advantageously, the plan area of the refining tank is at least as great as that of the melting tank. The adoption of this feature has been found to be particularly beneficial for the economical manufacture of well refined glass.

The invention is particularly suitable for the production of a high quality melt which is suitable for forming into sheets, for example by the float process. In preferred embodiments, therefore, the conditioning tank is connected for feeding molten glass to a float chamber.

Alternatively, or in addition, it is preferred that the conditioning tank is connected for feeding molten glass to a drawing machine. Such embodiments are particularly suitable for the production of sheet glass which is thinner than can conveniently be made by the float process.

BRIEF DESCRIPTION OF THE DRAWINGS

The present invention will now be further described with reference to the accompanying diagrammatic drawings in which.

DESCRIPTION OF THE PREFERRED EMBODIMENTS

Figure 1:
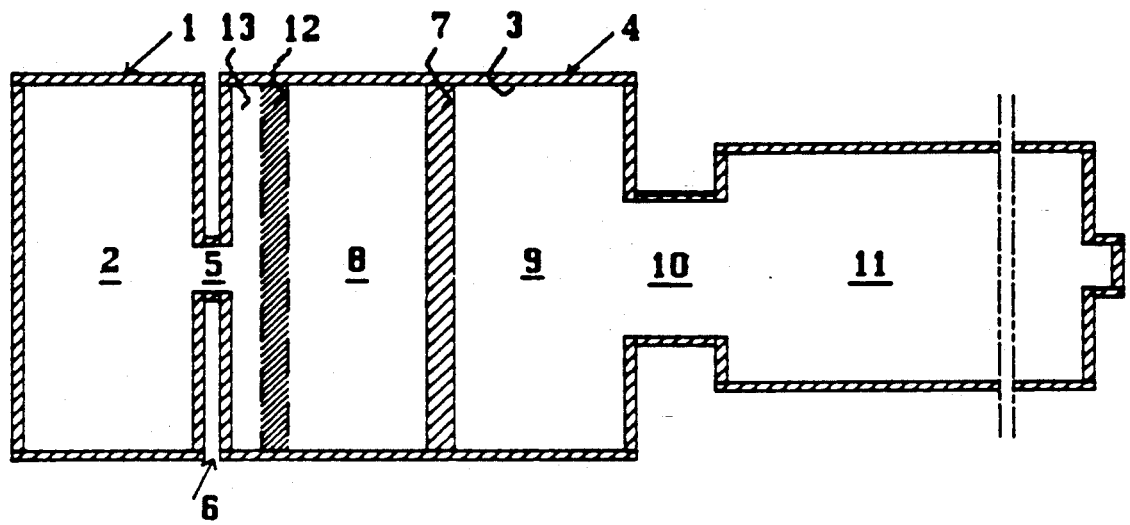
FIGS. 1 and 2 are respectively sectional plan and side views of a continuous glass-melting tank furnace according to the invention, which comprises a melting compartment, a refining compartment and a conditioning tank.
Figure 2:
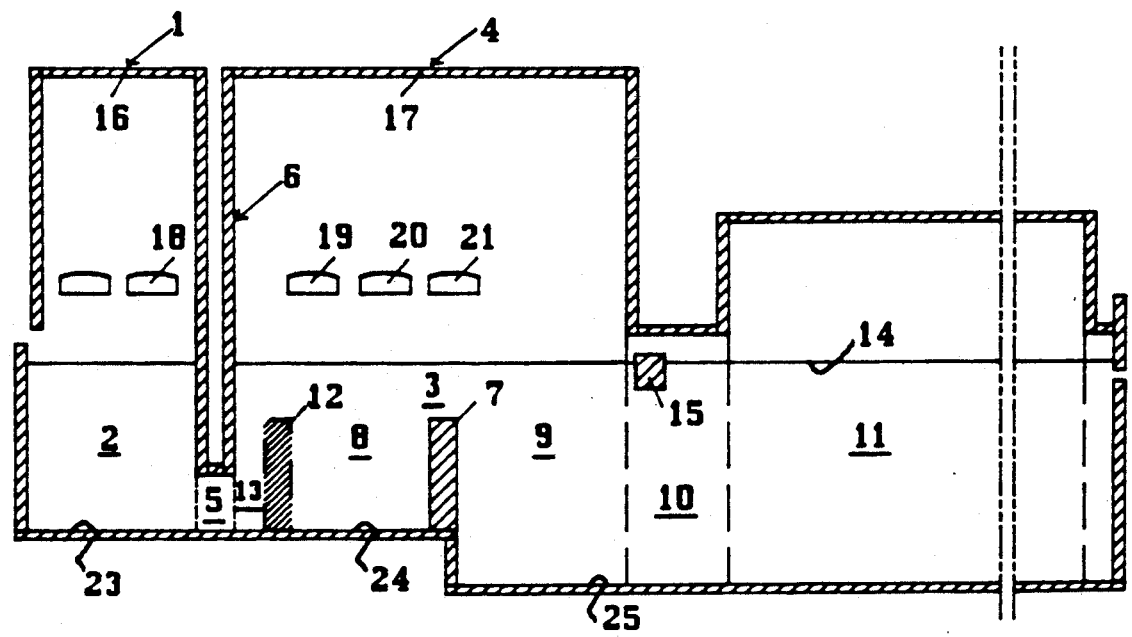

In FIGS. 1 and 2, a continuous glass-melting tank furnace comprises a melting compartment 1 including a tank 2 which is in melt flow communication with a tank 3 of a refining compartment 4 via a submerged throat 5 beneath a wall structure 6 which constitutes the downstream end wall of the melting tank 2 and the upstream end wall of the refining tank 3. On the sole of the refining tank 3 is located a transverse sill 7 which divides the refining tank 3 into upstream and downstream refining cells 8 and 9. In the embodiment illustrated, the length of the upstream refining cell 8 is greater than its depth, and that length is also greater than the width of the upstream refining cell 8. At the downstream end of the refining tank 3 is provided a neck 10 giving communication with a conditioning tank 11 whence molten glass may be drawn off and fed to a glass shaping apparatus not shown. Such a glass shaping apparatus may, and preferably does, comprise a float chamber and/or a flat glass drawing machine. The outlet of the conditioning tank 11 illustrated is in fact designed for feeding to a float chamber. The shaping apparatus may alternatively, or in addition, take the form of one or more rolling machines for the production of figured glass, or molding machines for the production of glass bottles or other hollow ware. It will however be appreciated that quality requirements for figured glass and hollow ware are not usually so high as those for sheet glass.

A second optional sill 12 is provided a short distance downstream of the throat 5 to define a rising passageway 13 through which the melt enters the refining tank 3. For this purpose, the top of that second sill 12 is located at a level which is higher than the top of the throat 5.

The melt surface level is represented in FIG. 2 by the line 14. A floater 15 is positioned at the downstream end of the refining compartment 4 in the entrance of the neck 10.

Figure 3:
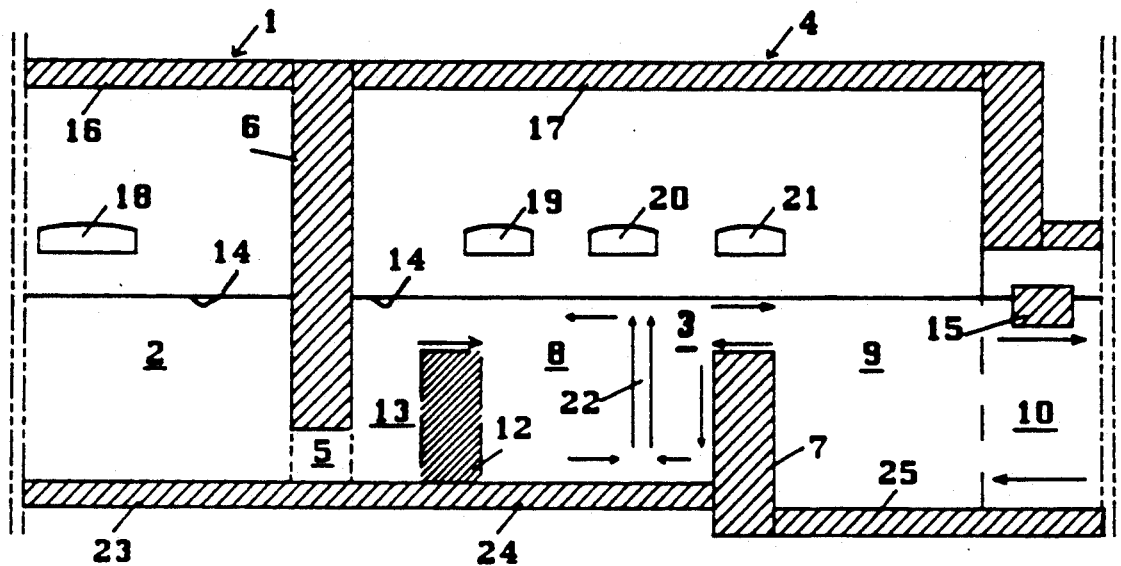
FIG. 3 is an enlarged cross-sectional sideview of the refining compartment of the tank furnace of FIG. 1.
Figure 4:
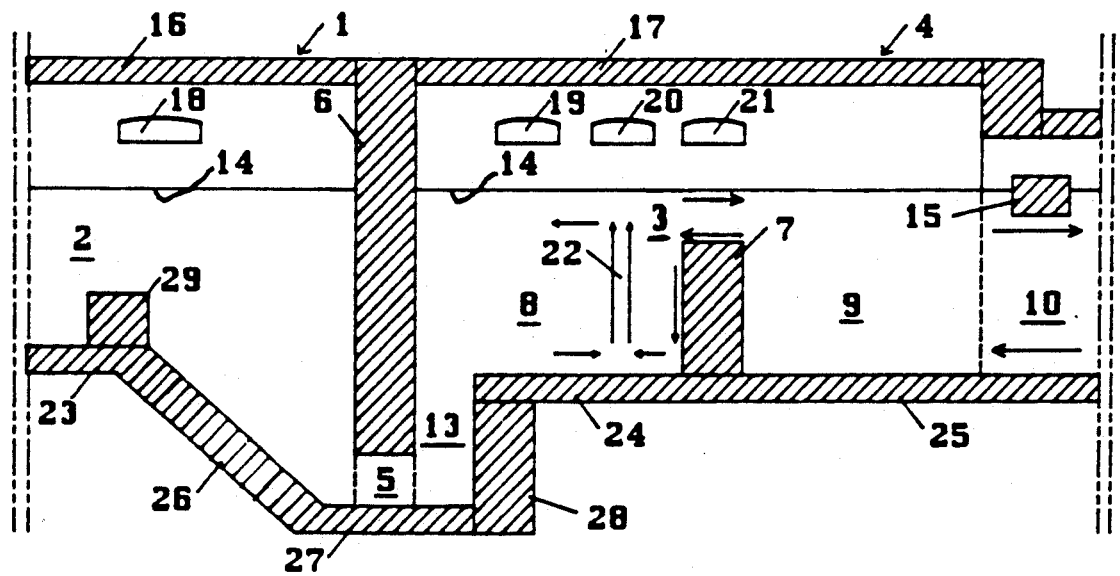
FIG. 4 is a cross-sectional side view of the refining compartment of a first alternative embodiment of tank furnace.

In FIGS. 3 and 4, those parts which are also shown in FIGS. 1 or 2 are allotted the same reference numerals. FIGS. 3 and 4 also show how the wall structure 6 separates the atmospheres contained by superstructures 16 and 17 respectively of the melting and refining compartments 1 and 4. Also shown is the downstream end burner 18 for each melting compartment 1, and three transverse burners 19, 20, 21 in each refining compartment 4, of which the downstream one 21 is located over the transverse sill 7. These burners 19, 20, 21 are located and adjusted to maintain a spring zone represented by arrow 22 in the upstream cell 8 of the refining tank 3 which is upstream of the transverse sill 7, but closer to that sill than to the wall structure 6.

In the embodiment shown in FIGS. 1, 2 and 3, the sole 23 of the melting tank 1 is at the same level as the sole 24 of the upstream cell 8 of the refining tank 3, upstream of the transverse sill 7, and this level is slightly higher, for example about 0.3 m, than the level of the sole 25 of the refining tank 3 downstream of that transverse sill 7 which continues to form the sole of the neck 10 and the conditioning zone 11.

In operation of the embodiment shown in FIG. 3, there will be a forward flow of melt through the throat 5 and up the rising passage 13. Because of the configuration of this rising passage, there can be substantially no return flow from the refining tank 3 to the melting tank 2, provided that the refining tank is maintained hotter than the melting tank so that the melt in the refining tank is less dense than that entering it. Melt flowing up the rising passage 13 will flow over the second sill 12 as a sub-surface current because it is cooler than the melt which has previously been exposed to the burners 19 to 21, and it will therefore also form a falling current on the downstream side of that second sill 12 feeding a forward flow of melt in the upstream refining cell 8 between the two sills, leading towards the spring zone 22. Because the melt there is at its hottest and least dense, it will form a rising current which will flow outwards in all directions across the surface of the melt. Part of that surface flow will be constituted by return surface currents flowing back towards the wall structure 6. The angle subtended by the wall structure 6 at the spring zone 22 will clearly be smaller as the spacing between them increases. As a result, the surface return currents directed back towards the wall structure in the embodiment illustrated can have a sufficient component in the longitudinal direction of the furnace to confine against the wall structure any bubbles which rise to the surface of the melt in the upstream refining cell 8 upstream of the spring zone. Surface return currents flowing to the wall structure will be cooled slightly by contact with that wall structure and/or by contact with melt entering the upstream refining cell from the melting tank, and they will therefore descend to join freshly introduced melt and circulate back down the second sill 12 and along the sole 24 to the spring zone 22. Surface currents flowing downstream from the spring zone 22 will flow over the transverse sill 7 into the downstream cell 9 of the refining compartment 4 and thence through the neck 10 to the conditioning tank 11. In the conditioning tank 11, (not shown in FIG. 3,) melt coming into contact with the side and end walls will also be cooled to form sinking currents, and these will feed bottom return currents flowing along the sole 25. Flow of these currents back into the refining tank 3 will be restricted by the presence of the neck 10, but nevertheless, there will be some melt in these currents which will flow to form a rising current at the downstream side of the transverse sill 7 and this will flow up over that sill and descend to feed the base of the spring zone 22 from the downstream end. The presence of this over sill return current forces a very shallow forward surface current over the sill so that melt in that forward current is well exposed to heat from the downstream burner 21 over the sill 7. This system of currents promotes good mixing and refining of the melt in the refining tank.

In the absence of the optional second sill 12, melt flowing through the throat 5 will tend to flow as a forward bottom current directly to the base of the spring zone 22. Again return surface currents will be generated and maintained, but since these return currents will not be impeded by the presence of the second sill, they can descend to the base of the wall structure and then join the forward bottom current feeding the base of the spring zone. In this case, there might be a slight return current through the throat.

With the presence of the second sill 12, the sole 24 of the upstream refining cell 8 will tend to be hotter than when that sill is not present. This will of course lead to an increased rate of erosion of the sole 24, even to such an extend as to shorten its working life to an unacceptable degree. It may not always be possible to compensate for this adequately by reducing the heating of the upstream refining cell 8 having regard to the temperatures which are necessary to effect adequate degassing of the melt. One way of compensating would be to make the sole 24 of a higher grade refractory than would be required if the second sill were not present. Another way of compensating would be to drop the level of the sole 24 of the upstream refining cell 8, for example to the level of the sole 25 of the downstream refining cell 9. The additional depth of melt in the upstream refining cell 8 would then have an increased shielding effect on the sole 24 against radiant heat from the burners 19 to 21.

In the embodiment of FIG. 4, the sole 23 of the melting tank 2 slopes down at its downstream end as shown at 26 to form a sunken throat 5, below the level of the sole 24 of the upstream refining cell 8. That throat sole 27 is connected to the upstream refining cell sole 24 by a wall 28 which, with the wall structure 6 defines a rising passage 13 for the melt to enter the refining tank from the melting tank. A sill 29 is provided in the melting tank 2 at the junction between the horizontal and sloping portions 23 and 26 of the tank sole to encourage a rising flow of melt in the melting tank 2 and thus impede any direct forward bottom flow of partially melted material from the melting tank into the throat. In this embodiment, the flow pattern downstream of the immediate vicinity of the throat is very similar to that of the FIG. 3 embodiment without the optional second sill. It will be noted though that there will be very little, if any, possibility of glass forming a return current flowing back through the throat from the refining tank. It is to be noted that such a second sill could be provided in the embodiment shown in FIG. 4 if desired, for example above the throat end wall 28.

In the FIG. 4 embodiment, the soles 24, 25 of the upstream and downstream refining cells 8, 9 are at the same level, a level which is lower, for example 30 cm lower, than the level of the horizontal sole portion 23 of the melting tank.

A specific embodiment of continuous glass-melting tank furnace designed in accordance with FIGS. 1 to 3 for the production of glass at a rate of 50 tonnes per day has the following dimensions.

| | |
|---|---|
| Width of melting tank 2 | 4.0 m |
| Width of throat 5 | 0.7 m |
| Width of refining tank 3 | 4.0 m |
| Width of neck 10 | 1.2 m |
| Width of conditioning tank 11 | 3.6 m |
| Depth of melting tank 2 | 0.9 m |
| Height of throat 5 | 0.3 m |
| Depth of upstream refining cell 8 | 0.9 m |
| Depth of downstream refining cell 9 | 1.2 m |
| Depth of neck 10 | 1.2 m |
| Depth of conditioning tank 11 | 1.2 m |
| Depth of melt above transverse sill 7 | 0.3 m |
| Depth of melt above second sill 12 | 0.3 m |
| Length of melting tank 2 | 4.5 m |
| Length of throat 5 | 1.2 m |
| Length occupied by passageway 13 | 0.6 m |
| Length occupied by transverse sill 7 | 0.6 m |
| Length between sills of upstream cell 8 | 3.5 m |
| Length occupied by second sill 12 | 0.6 m |
| Length of downstream refining cell 9 | 4.0 m |
| Length of neck 10 | 3.0 m |
| Length of conditioning tank 11 | 6.0 m |

For the production of highly refined soda-lime glass of ordinary composition, such a furnace may be run with a maximum melt temperature in the melting tank of about 1375° C. (the 2.33 temperature) while the maximum temperature of the melt in the refining tank is about 1475° C. (the 2.0 temperature).

Figure 5:
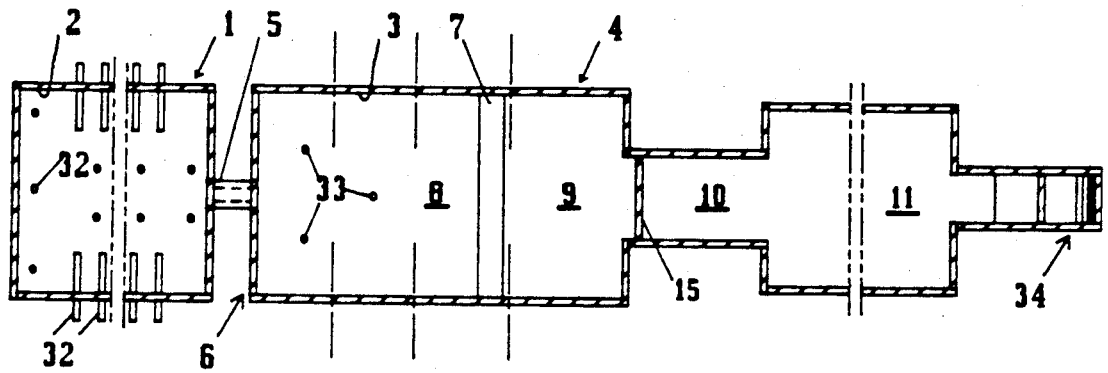
FIGS. 5 and 6 are respectively cross-sectional plan and side views of a second alternative embodiment of tank furnace.
Figure 6:
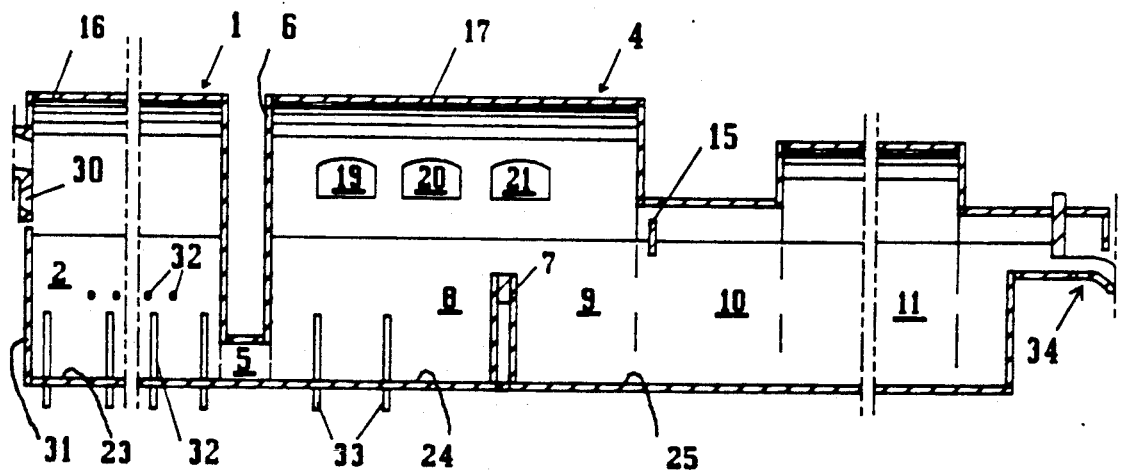

In the embodiment shown in FIGS. 5 and 6, the melting compartment 1 is of the end-fired or horseshoe-flame type in which burner ports such as 30 are provided in the charging end wall 31. A plurality of electrodes 32 are immersed in the melt in the melting tank 2 to provide supplementary heat energy for melting the batch. The sole 23 of the melting tank 2 and the sole 24 of the upstream refining cell 8 are on the same level so the melt enters that refining cell through a straight throat 5. The sole 25 of the downstream refining cell 9, the neck 10 and the conditioning tank 11 are also at that same level.

The refining compartment 4 is cross-fired by using three burner ports 19, 20, 21 at each side. The downstream burner port 21 shown is located above transverse sill 7 separating the upstream and downstream refining cells 8 and 9. Additional heat energy is supplied to the upstream refining cell 8 using booster electrodes 33 projecting upwardly through the sole 24 of that cell, of which one electrode is located substantially in the center of the cell 8 and two are located towards the upstream end wall structure 6 of the refining compartment. The use of such booster electrodes 33 in the upstream refining cell 8 is beneficial for promoting a desirable and stable flow pattern of convection currents in the melt in that cell.

The length of the upstream refining cell 8, that is the distance between the transverse sill 7 and the upstream end wall 6, is greater than its width, and its width is in turn greater than the depth of melt in that cell. The melting tank 2 and the refining tank 3 have the same width. The depth of melt above the transverse sill 7 is about one quarter of the total depth of melt in the tank furnace.

Refined melt leaving the downstream refining cell 9 passes beneath floater 15 to enter the neck 10 and thence flows into the conditioning tank 11 to the outlet end of the furnace, here shown as a pouring spout 34 for supplying molten glass to a rolling machine or float chamber (not shown).

A specific embodiment of continuous glass-melting tank furnace designed in accordance with FIGS. 5 and 6 for the production of glass at a rate of 250 tonnes per day has a melting tank 2 which is 89 m$^2$ (8.5 m × 10.5 m) in plan area, a refining tank 3 which is 148 m$^2$ (8.5 m × 17.4 m) in plan area, and a conditioning tank 11 which is 120 m$^2$ in plan area.

Figure 7:
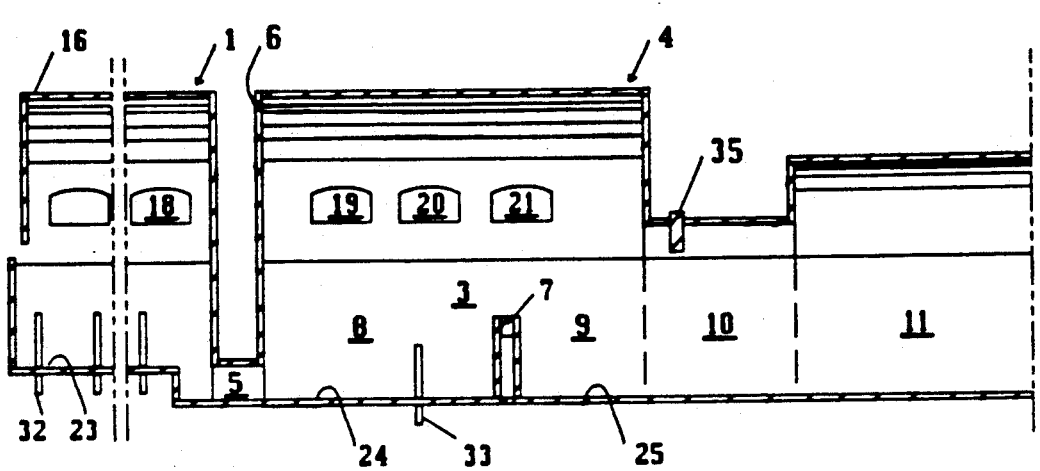
FIG. 7 is a cross-sectional side view of a third alternative embodiment of tank furnace.

In the furnace of FIG. 7, the melting compartment 1 is cross-fired, and electrodes 32 project up through the sole 23 to provide supplementary energy for melting the batch. The level of the melting tank sole 23 is dropped at its downstream end so that the throat 5 is beneath the level of the melting tank sole. The sole 24 of the upstream refining cell 8 is at the level of the sole of the throat as is the sole 25 of the downstream refining cell and the sole of the neck 10 and conditioning tank 11.

The refining compartment 4 of the furnace of FIG. 7 is broadly similar design to that shown in FIGS. 5 and 6, except for the arrangement of booster electrodes 33 in the upstream refining cell. In FIG. 7, there is a row of four vertical electrodes 33 located closer to the sill 7 than to the upstream end wall 6. The electrodes 33 may for example be located substantially along the neutral line of the cell 8, that is, the transverse line passing through the spring zone (as compared to 22 in FIGS. 3 and 4). The use of such electrodes promotes upward flow of melt at the spring zone and gives a better definition of, or redefines, the location of that spring zone, thus promoting good mixing and refining of the melt.

On leaving the refining tank 3, the melt enters the neck 10 passing beneath a bridgewall 35 which is clear of the surface of the melt, and then passes to the conditioning tank 11 whence it may be fed to any desired glass shaping apparatus.

The length of the upstream refining cell 8, that is the distance between the transverse sill 7 and the upstream end wall 6, is greater than its width, and its width is in turn greater than the depth of melt in that cell. The melting tank 2 and the refining tank 3 have the same width. The depth of melt above the transverse sill 7 is about two-fifths of the total depth of melt in the upstream refining cell 8.

A specific embodiment of continuous glass-melting tank furnace designed in accordance with FIG. 7 for the production of glass at a rate of 500 tonnes per day has a melting tank 2 which is 141 m$^2$ (10 m × 14.1 m) in plan area, a refining tank 3 which is 234 m$^2$ (10 m × 23.4 m) in plan area, and a conditioning tank 11 which is 160 m$^2$ in plan area.

Figure 8:
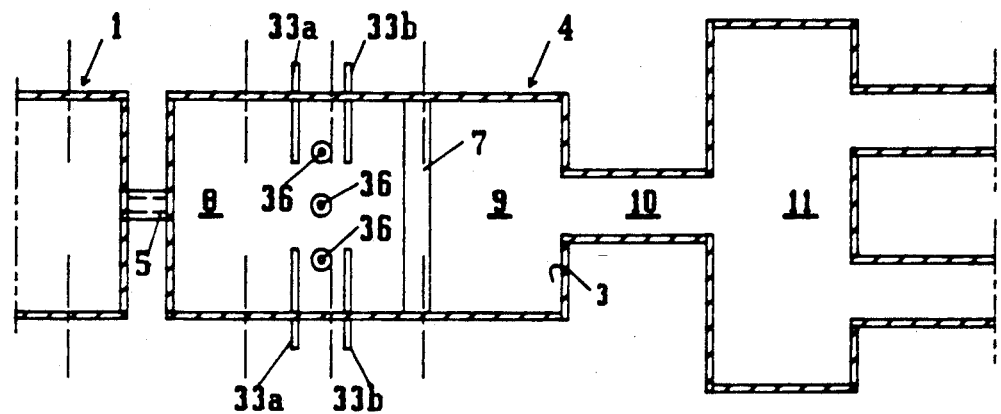
FIGS. 8 and 9 are respectively cross-sectional plan and side views of a fourth alternative embodiment of tank furnace.
Figure 9:
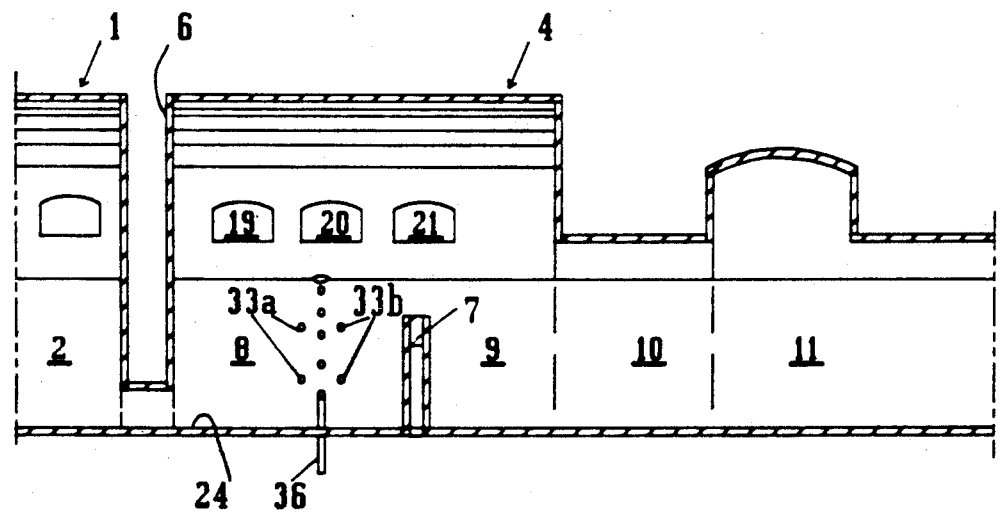

In the embodiment of FIGS. 8 and 9, the design of melting compartment 1 is substantially as described with reference to FIGS. 1 and 2. The sole of the entire furnace is at the same level and the melt enters the refining compartment 4 through a straight throat 5.

The refining compartment 4 is of broadly similar design to that described with reference to FIGS. 5 and 6, the main differences being the arrangement of booster electrodes 33 and the provision of gas injectors 36 in the upstream refining cell 8. Along the neutral line of that cell, a row of three gas injectors 36 projects upwardly through the sole 24. The central injector 36 is located to define the spring zone. Vertically spaced pairs 33$a$, 33$b$ of booster electrodes project into the melt in refining cell 8 through its side walls. At each side of the refining cell, one pair 33$a$ of booster electrodes is located spaced slightly upstream of the neutral line, and the other pair 33$b$ is located spaced slightly downstream of that line. This arrangement of gas injectors and booster electrodes is highly beneficial for obtaining a well-defined spring zone and a stable flow pattern in the melt for good mixing and refining.

In a variant, the downstream pairs of booster electrodes 33$b$ are omitted, and in another variant, additional upstream pairs of booster electrodes 33 are provided close to the indicated positions 33$a$. These arrangements are also highly beneficial for achieving good refining and mixing of the melt.

On leaving the refining tank 3, the melt enters a neck 10 which is narrower than the necks 10 of previously described embodiments. Accordingly, no floater 15 or bridgewall 35 is provided at the entrance to the neck 10 in this embodiment. From the neck 10, the melt passes into a conditioning tank 11 having twin outlets for feeding two glass shaping machines, for example drawing machines.

A specific embodiment of continuous glass-melting tank furnace designed in accordance with FIGS. 8 and 9 for the production of glass at a rate of 100 tonnes per day has a melting tank 2 which is 36 m$^2$ (6 m $\times$ 6 m) in plan area, and a refining tank 3 which is 59 m$^2$ (6 m $\times$ 9.8 m) in plan area.

Figure 10:
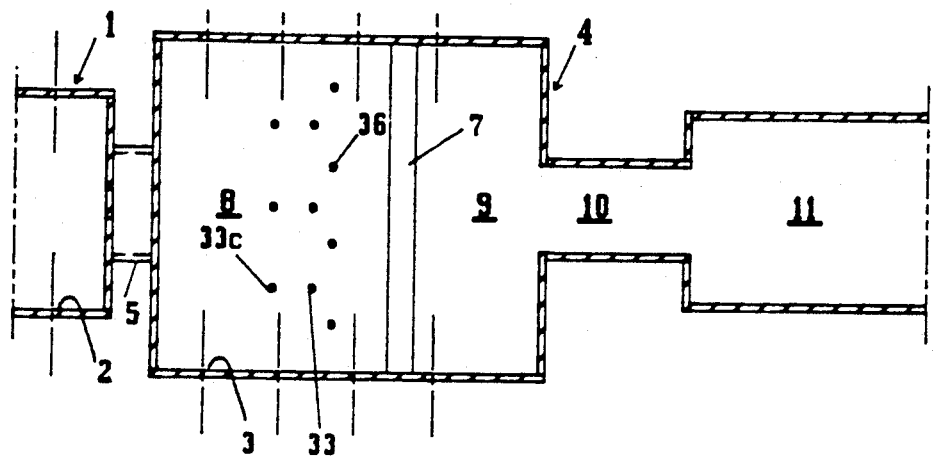
FIGS. 10 and 11 are respectively cross-sectional plan and side views of a fifth alternative embodiment of tank furnace.
Figure 11:
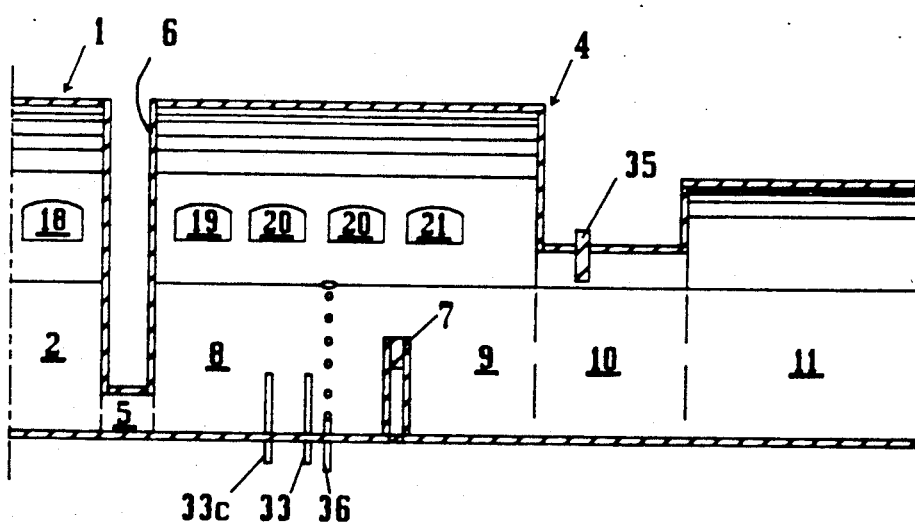

FIGS. 10 and 11 illustrate an embodiment of a continuous glass-melting tank furnace which is particularly suitable for the manufacture of glass at rather high production rates, for example 600 tonnes per day. The entire furnace sole is at one level. The melting compartment 1 is of similar design to that described with reference to FIGS. 1 and 2, and the melt passes from the melting tank 2 into the refining tank 3 via a straight throat 5 which is wider than the throats 5 of previously described embodiments. The refining tank 3 is wider than the melting tank 2.

The refining compartment 4 is cross-fired, and because of its high design capacity it is provided with four burner ports at each side. The downstream burner port 21 is located to heat melt downsteam of the transverse sill 7 as well as melt flowing over that sill. The sill 7 occupies some two-thirds of the total depth of the melt, and it is located at a distance from the upstream end wall 6 of the refining tank which is about twice the depth of the melt, and approximately five-sixths of the width of the refining tank.

A row of four gas injectors 36 is arranged along the neutral line of the upstream refining cell 8. A staggered transverse row of three booster electrodes 33 projects upwardly through the sole of that cell at a location which is close to but upstream of the neutral line. A second row of booster electrodes 33$c$ is preferably provided upstream of the first. If desired, such a second row of booster electrodes could be located downstream of the neutral line.

A specific embodiment of a continuous glass-melting tank furnace designed in accordance with FIGS. 10 and 11 for the production of glass at a rate of 600 tonnes per day has a melting tank 2 which is 150 m$^2$ in plan area, a refining tank 3 which is also 150 m$^2$ in plan area, and a conditioning tank 11 which is 160 m$^2$ in plan area.

Figure 12:
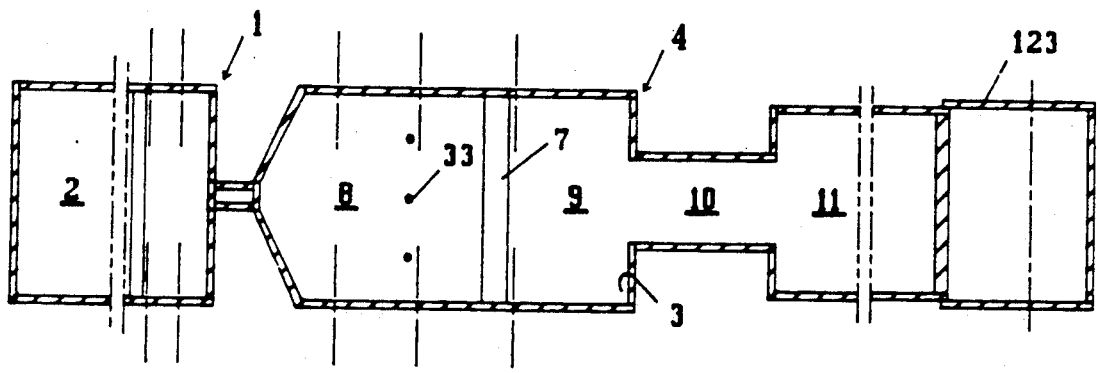
FIGS. 12 and 13 are respectively cross-sectional plan and side views of a sixth alternative embodiment of tank furnace.
Figure 13:
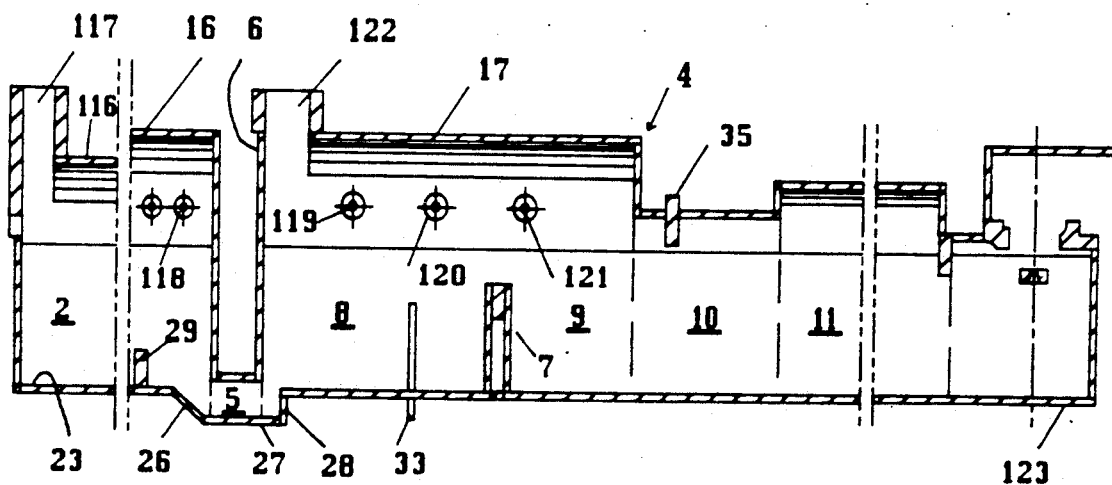

FIGS. 12 and 13 illustrate a continuous glass-melting tank furnace in accordance with this invention.

In the melting compartment 1, batch material is melted by continuously operating side burners 118 whose flames are constrained to lick the surface of the material in the tank by virtue of a lowered portion 116 of the melting tank superstructure. The fuel fed to the burners may be oil or gas. Flames and fumes are then drawn up through chimney 117.

The flow of melt from the melting tank 2 to the refining tank 3 is controlled by a sill 29 in the melting tank and a dropped narrow throat 5 as described with reference to FIG. 4. The sole 23 of the melting tank is at the same level as the soles of the other compartments of the furnace.

In the refining compartment, continuously operating side burners 119, 120, 121 are provided at each side, and fumes and flames are drawn off from the refining compartment through a chimney 122. It is convenient to use gas burners in the refining compartment. The upstream end wall 6 of the refining compartment 4 is oblique. The transverse sill 7 is located so that the mean length of the upstream refining cell is greater than its width. The width of that cell is in turn greater than its depth. The sill occupies some four-fifths of the depth of the melt.

A transverse row of three booster electrodes 33 projects upwardly through the sole of the cell 8 at the neutral line. A second row of booster electrodes may be provided upstream of the first if desired.

Molten refined glass leaving the refining tank 3 passes through the neck 10, into a conditioning tank 11 and thence directly into the drawing tank 123 of a horizontal glass drawing machine.

A specific embodiment of a continuous glass-melting tank furnace designed in accordance with FIGS. 12 and 13 for the production of glass at a rate of 50 tonnes per day has a melting tank 2 which is 20 m$^2$ (4 m $\times$ 5 m) in plan area, and a refining tank 3 which is 33 (4 m $\times$ 8.3 m) m$^2$ in plan area.

Figure 14:
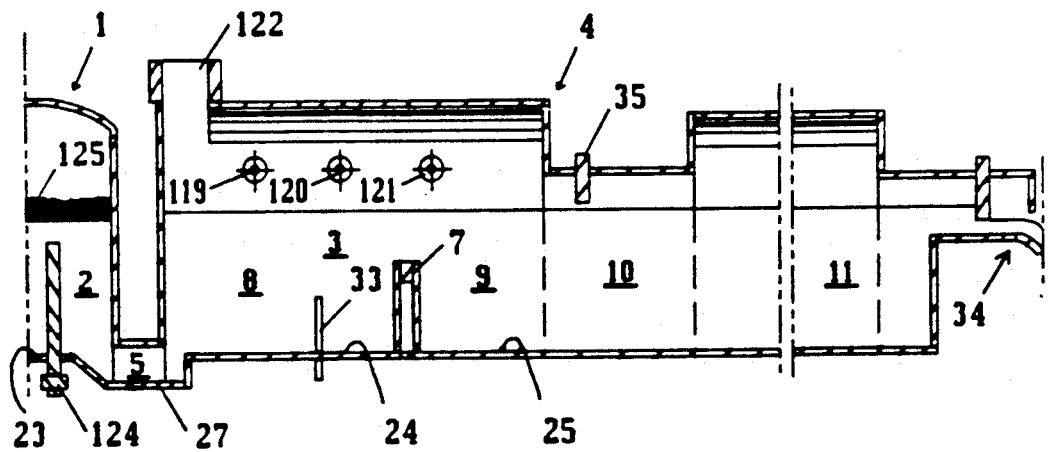
FIG. 14 is a cross-sectional side view a seventh alternative embodiment of tank furnace.

FIG. 14 illustrates a further embodiment of a furnace for the continuous production of molten glass. In FIG. 14, the melting compartment is of the cupola type, in which melting is effected by means of a plurality of vertical electrodes 124 leading through the sole 23 of the melting tank 2 to provide heat energy for melting batch material 125 which is uniformly spread over the surface of the molten material in the tank 2. The melting tank 2 communicates with the refining tank 3 via a dropped throat 5 (compare FIG. 13, through no sill is provided in the melting tank). The design of the refining compartment 4, the neck 10 and conditioning tank is the same as that of the embodiment shown in FIGS. 12 and 13, though the outlet end of the furnace is shown as being provided with a pouring spout 34 for feeding a float chamber or casting machine.

We claim:

1. A continuous glass-melting tank furnace, comprising:

a melting compartment including a melting tank having a lower part, and a superstructure equipped with heating means for receiving and melting raw batch material;

a separate refining compartment including a refining tank having an upstream end and a downstream end and a superstructure equipped with a further heating means, the refining tank having a lower part and including a transverse sill which divides the refining tank into an upstream refining cell and a downstream refining cell, each of the upstream refining cell and the downstream refining cell having respective upstream ends and downstream ends, and the further heating means being arranged to heat melt in the upstream refining cell for creating a spring zone located closer to the downstream end of the upstream refining cell and a circulation of melt in the upstream refining cell which feeds the spring zone;

means defining a throat allowing communication between the lower parts of the melting tank and the upstream end of the refining tank; and a conditioning tank for receiving melt from the downstream end of the refining tank.

2. The continuous glass-melting tank furnace according to claim 1, wherein the upstream cell of the refining tank has a length and a mean depth, and wherein the mean depth is less than the length.

3. The continuous glass-melting tank furnace according to claim 1, wherein the upstream cell of the refining tank has a length and a means width, and wherein the means length is at least equal to half of the mean width.

4. The continuous glass-melting tank furnace according to claim 3, wherein the refining tank includes an upstream end wall and wherein said transverse sill is spaced from the upstream end wall of the refining tank by a distance which is at least equal to the mean width of the upstream refining cell.

5. The continuous glass-melting tank furnace according to claim 1, wherein the transverse sill has a mean height, and wherein the downstream cell includes a sole and has a mean depth so that the mean height of the transverse sill above the sole of the downstream cell of the refining tank is at least three fifths of the mean depth of the downstream cell.

6. The continuous glass-melting tank furnace according to claim 1, wherein the refining compartment superstructure includes heaters which, considered as a group, are located closer to said transverse sill than to the upstream end of the refining compartment.

7. The continuous glass-melting tank furnace according to claim 6, wherein one of said heaters is located to heat material flowing above said transverse sill.

8. The continuous glass-melting tank furnace according to claim 1, wherein the melting tank includes a sole, wherein the refining tank includes a sole, and wherein the sole of at least a part of the melting tank is at a higher level than the sole of at least a part of the refining tank.

9. The continuous glass-melting tank furnace according to claim 1, further comprising means defining a rising passageway, wherein the throat means communicates with the upstream refining cell via the rising passageway means.

10. The continuous glass-melting tank furnace according to claim 9, wherein the upstream refining cell includes a sole and wherein the throat means is located beneath the level of the sole of the upstream refining cell.

11. The continuous glass-melting tank furnace according to claim 9, wherein said rising passageway means comprises a second sill provided towards the upstream end of the upstream refining cell.

12. The continuous glass-melting tank furnace according to claim 1, further comprising at least one heating electrode provided for immersion in the melt in the upstream refining cell.

13. The continuous glass-melting tank furnace according to claim 12, further comprising means for injecting gas into the refining tank at the spring zone.

14. The continuous glass-melting tank furnace according to claim 13, wherein at least one said heating electrode is provided at a location closer to the upstream end of the upstream refining cell than the location of the gas injection means.

15. The continuous glass-melting tank furnace according to claim 1, further comprising a means defining a neck which connects the down stream end of the refining tank to said conditioning tank.

16. The continuous glass-melting tank furnace according to claim 1, further comprising a floater provided at the downstream end of the refining tank.

17. The continuous glass-melting tank furnace according to claim 1, wherein the refining tank has a plan area, wherein the melting tank has a plan area, and wherein the plan area of the refining tank is at least as great as the plan area of the melting tank.

18. The continuous glass-melting tank furnace according to claim 1, further comprising a pouring tank connected to said conditioning tank for feeding molten glass to a float chamber.

19. The continuous glass-melting tank furnace according to claim 1, further comprising a drawing tank connected to said conditioning tank for feeding molten glass to a horizontal glass drawing machine.

* * * * *